(12) United States Patent
Shen et al.

(10) Patent No.: US 12,513,725 B2
(45) Date of Patent: Dec. 30, 2025

(54) METHOD AND APPARATUS FOR CONFIGURING PHYSICAL UPLINK CONTROL CHANNEL RESOURCE SET AND DETERMINING STARTING SYMBOL

(71) Applicant: GUANGDONG OPPO MOBILE TELECOMMUNICATIONS CORP., LTD., Guangdong (CN)

(72) Inventors: Jia Shen, Dongguan (CN); Jing Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 909 days.

(21) Appl. No.: 17/246,322

(22) Filed: Apr. 30, 2021

(65) Prior Publication Data

US 2021/0258965 A1 Aug. 19, 2021

Related U.S. Application Data

(63) Continuation of application No. PCT/CN2018/113587, filed on Nov. 2, 2018.

(51) Int. Cl.
*H04W 72/53* (2023.01)
*H04W 72/044* (2023.01)
*H04W 72/0446* (2023.01)
*H04W 72/21* (2023.01)
*H04W 72/23* (2023.01)
*H04W 76/11* (2018.01)

(52) U.S. Cl.
CPC ....... *H04W 72/53* (2023.01); *H04W 72/0446* (2013.01); *H04W 72/0466* (2013.01);
(Continued)

(58) Field of Classification Search
None
See application file for complete search history.

(56) References Cited

U.S. PATENT DOCUMENTS

2014/0071928 A1 3/2014 Papasakellaríou et al.
2018/0220415 A1 8/2018 Yin et al.
(Continued)

FOREIGN PATENT DOCUMENTS

CN 108633021 A 10/2018

OTHER PUBLICATIONS

The EESR of corresponding European application No. 18938818.4, dated Nov. 9, 2021.
(Continued)

*Primary Examiner* — Andre Tacdiran
(74) *Attorney, Agent, or Firm* — Ladas & Parry, LLP

(57) ABSTRACT

A method and an apparatus for configuring a PUCCH resource set and determining a starting symbol are disclosed, where the method for configuring a PUCCH resource set may include: determining, by a terminal device, a target time-domain structure; determining, by the terminal device, a group of PUCCH resource sets corresponding to the target time-domain structure, where a group of PUCCH resource sets is respectively configured for a different time-domain structure; and determining, by the terminal device, a PUCCH resource set from a group of PUCCH resource sets corresponding to the target time-domain structure, and determining, by the terminal device, a PUCCH resource from the determined PUCCH resource set, where the determined PUCCH resource is used for transmitting UCI. By applying the solution described in the present application, more flexible PUCCH resource allocation can be realized, and efficiency of resource utilization in a PUCCH resource set can be improved, etc.

8 Claims, 7 Drawing Sheets

(52) U.S. Cl.
CPC ........... *H04W 72/21* (2023.01); *H04W 72/23* (2023.01); *H04W 76/11* (2018.02)

(56) References Cited

U.S. PATENT DOCUMENTS

| | | | |
|---|---|---|---|
| 2019/0132861 A1* | 5/2019 | Koorapaty | H04L 1/1861 |
| 2020/0008194 A1* | 1/2020 | Huang | H04W 72/0446 |
| 2020/0366426 A1* | 11/2020 | Han | H04L 5/0055 |

OTHER PUBLICATIONS

Sharp: "PUCCH enhancements for URLLC HARQ-ACK feedback", 3GPP Draft; R1-1809112, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018 Aug. 11, 2018(Aug. 11, 2018), XP051516481, entire document.

VIVO: "Discussion on short PUCCH for URLLC", 3GPP Draft; R1-1806061 Discussion on Short PUCCH for URLLC, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018 May 12, 2018(May 12, 2018), XP051462326, entire document.

The international search report in PCT application No. PCT/CN2018/113587, dated Jul. 23, 2019.

LG Electronics; "Overall structure of UL control channel for NR"; 3GPP TSG RAN WG1 Meeting #87. R1-1611840; Reno, USA Nov. 14-18, 2016; (Nov. 18, 2016), entire document.

Written Opinion of the International Searching Authority in PCT application No. PCT/2018/113587, dated Jul. 23, 2019 with English translation provided by Google Translate.

* cited by examiner

METHOD AND APPARATUS FOR CONFIGURING PHYSICAL UPLINK CONTROL CHANNEL RESOURCE SET AND DETERMINING STARTING SYMBOL

CROSS-REFERENCE TO RELATED APPLICATIONS

This application is a continuation of International Application No. PCT/CN2018/113587 filed on Nov. 2, 2018, the content of which is incorporated herein by reference in its entirety.

TECHNICAL FIELD

The present application relates to wireless network technologies, and in particular to a method and an apparatus for configuring a physical uplink control channel resource set and determining a starting symbol.

BACKGROUND

In a 5G system, the network can configure a group of physical uplink control channel (PUCCH) resource sets (at most 4 PUCCH resource sets) for a terminal device. Each of the PUCCH resource sets may include a plurality of PUCCH resources, and downlink control information (DCI) indicates a PUCCH resource from the plurality of PUCCH resources in a PUCCH resource set for transmitting uplink control information (UCI), etc.

The PUCCH resource is indicated in a unit of a slot, and both a starting symbol and a length relative to a slot are all adapted to a size of the slot. A granularity of the PUCCH resource configured in the unit of the slot is relatively coarse, which cannot meet fast feedback requirements of Hybrid Automatic Repeat reQuest Acknowledgement (HARQ-ACK) for low-latency services.

In order to solve this problem, the granularity of PUCCH resource configuration needs to narrow down to a sub-slot level, and a sub-slot includes a part of symbols in a slot. For example, a slot includes 14 symbols. FIG. 1 is a schematic diagram of a first example of a sub-slot structure. As shown in FIG. 1, a slot is divided into 2 sub-slots, and each sub-slot includes 7 symbols. FIG. 2 is a schematic diagram of a second example of a sub-slot structure. As shown in FIG. 2, a slot is divided into 4 sub-slots, and each sub-slot includes 3 or 4 symbols.

A slot-based PUCCH resource set can be configured with PUCCH resources of various lengths and starting symbols. As shown in Table 1, it is assumed that 16 PUCCH resources are configured in the PUCCH resource set.

TABLE 1

Example of slot-based PUCCH resource set configuration

| Serial number of resource | Time-domain length (symbols) | Serial number of starting symbol | Configuration of frequency domain and code domain etc. |
|---|---|---|---|
| 1 | 2 | 0 | Frequency domain and code domain numerology 1 |
| 2 | 2 | 3 | Frequency domain and code domain numerology 1 |
| 3 | 2 | 7 | Frequency domain and code domain numerology 1 |
| 4 | 2 | 10 | Frequency domain and code domain numerology 1 |
| 5 | 3 | 0 | Frequency domain and code domain numerology 2 |
| 6 | 3 | 3 | Frequency domain and code domain numerology 2 |
| 7 | 3 | 7 | Frequency domain and code domain numerology 2 |
| 8 | 3 | 10 | Frequency domain and code domain numerology 2 |
| 9 | 4 | 0 | Frequency domain and code domain numerology 3 |
| 10 | 4 | 4 | Frequency domain and code domain numerology 3 |
| 11 | 4 | 8 | Frequency domain and code domain numerology 3 |
| 12 | 7 | 0 | Frequency domain and code domain numerology 4 |
| 13 | 7 | 7 | Frequency domain and code domain numerology 4 |
| 14 | 10 | 0 | Frequency domain and code domain numerology 5 |
| 15 | 10 | 4 | Frequency domain and code domain numerology 5 |
| 16 | 14 | 0 | Frequency domain and code doma innumerology 6 |

For slot-based PUCCH resource allocation, all 16 resources in Table 1 can be allocated. However, for sub-slot-based PUCCH resource allocation, only a part of these resources are available. For example, for sub-slot 1 in FIG. 1, only resources 1, 2, 5, 6, 9, 10, and 12 are available. Other resources either have a length longer than 7 symbols, or have some symbols falling outside a scope of sub-slot 1, and which therefore cannot be used for PUCCH resource allocation for this sub-slot.

Therefore, if a unified PUCCH resource set is configured for the slot-based PUCCH and the sub-slot-based PUCCH, it would cause a few resources available for the sub-slot-based PUCCH, which greatly limits flexibility of PUCCH resource allocation and increases probability of PUCCH resource conflict between multiple users, etc.

SUMMARY

In view of this, embodiments of the present application provide a method and an apparatus for configuring a physical uplink control channel resource set and determining a starting symbol.

In a first aspect, a method for configuring a physical uplink control channel (PUCCH) resource set is provided, including:

determining, by a terminal device, a target time-domain structure;

determining, by the terminal device, a group of PUCCH resource sets corresponding to the target time-domain structure, where a group of PUCCH resource sets is respectively configured for a different time-domain structure; and determining, by the terminal device, a PUCCH resource set from a group of PUCCH resource sets corresponding to the target time-domain structure, and determining, by the terminal device, a PUCCH resource from the determined PUCCH resource set, where the determined PUCCH resource is used for transmitting uplink control information (UCI).

In a second aspect, a method for determining a physical uplink control channel (PUCCH) starting symbol is provided, including:
- determining, by a terminal device, a PUCCH resource, which includes PUCCH starting symbol information therein;
- determining, by the terminal device, K for indicating a time-domain offset amount between a PUCCH and a corresponding physical downlink shared channel PDSCH and a time-domain unit of K; and
- determining, by the terminal device, a meaning of the PUCCH starting symbol information according to the time-domain unit of K;
- if the time-domain unit of K is a slot, the PUCCH starting symbol information is a serial number of symbol of a PUCCH starting symbol in the slot; if the time-domain unit of K is less than a slot, the PUCCH starting symbol information is a symbol-level offset amount of the PUCCH starting symbol relative to a first reference point; and
- the first reference point is determined by a time-domain position of the PDSCH, K and the time-domain unit of K.

In a third aspect, a method for configuring a physical uplink control channel (PUCCH) resource set is provided, including:
- configuring, by a network device, a group of PUCCH resource sets respectively for a different time-domain structure for a terminal device to: after determining a target time-domain structure, determine a group of PUCCH resource sets corresponding to the target time-domain structure and determine a PUCCH resource set from a group of PUCCH resource sets corresponding to the target time-domain structure; and determine a PUCCH resource from the determined PUCCH resource set, where the determined PUCCH resource is used for transmitting uplink control information (UCI).

In a fourth aspect, an apparatus for configuring a physical uplink control channel (PUCCH) resource set is provided, which is configured to execute the method in the first aspect or various implementations thereof.

Specifically, the apparatus for configuring a PUCCH resource set includes a functional module for executing the method in the first aspect or various implementations thereof.

In a fifth aspect, an apparatus for determining a physical uplink control channel (PUCCH) starting symbol is provided, which is configured to execute the method in the second aspect or various implementations thereof.

Specifically, the apparatus for determining a PUCCH starting symbol includes a functional module for executing the method in the second aspect or various implementations thereof.

In a sixth aspect, an apparatus for configuring a physical uplink control channel (PUCCH) resource set is provided, which is configured to execute the method in the third aspect or various implementations thereof.

Specifically, the apparatus for configuring a PUCCH resource set includes a functional module for executing the method in the third aspect or various implementations thereof.

In a seventh aspect, a communication device is provided, including a processor and a memory, where the memory is configured to store a computer program, and the processor is configured to call and run the computer program stored in the memory to execute the method in any aspect of the first to third aspects or various implementations thereof.

In an eighth aspect, a chip is provided, which is configured to implement the method in any aspect of the first to third aspects or various implementations thereof.

Specifically, the chip includes: a processor, configured to call and run a computer program from a memory to cause a device mounted with the chip to execute the method in any aspect of the first to third aspects or various implementations thereof.

In a ninth aspect, a computer-readable storage medium is provided for storing a computer program that enables a computer to execute the method in any aspect of the first to third aspects or various implementations thereof.

In a tenth aspect, a computer program product is provided, including a computer program instruction that causes a computer to execute the method in any aspect of the first to third aspects or various implementations thereof.

In an eleventh aspect, a computer program is provided, which, when running on a computer, causes the computer to execute the method in any aspect of the first to third aspects or various implementations thereof.

Based on the above introduction, it can be seen that using the solution described in the present application, corresponding PUCCH resource sets can be respectively configured for different time-domain structures, so that more flexible PUCCH resource allocation can be realized, and probability of PUCCH resource conflict between multiple users can be reduced, and efficiency of resource utilization in a PUCCH resource set is improved, etc.

DESCRIPTION OF EMBODIMENTS

Technical solutions in embodiments of the present application will be described below with reference to the drawings in the embodiments of the present application. Obviously, the embodiments described are a part of but not all the embodiments of the present application. Based on the embodiments in the present application, all other embodiments obtained by those of ordinary skill in the art without paying creative efforts fall within the protection scope of the present application.

The technical solutions of the embodiments of the present application can be applied to various communication systems, such as: a Global System of Mobile communication (GSM) system, a Code Division Multiple Access (CDMA) system, and a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system or a 5G system, etc.

Figure 3:
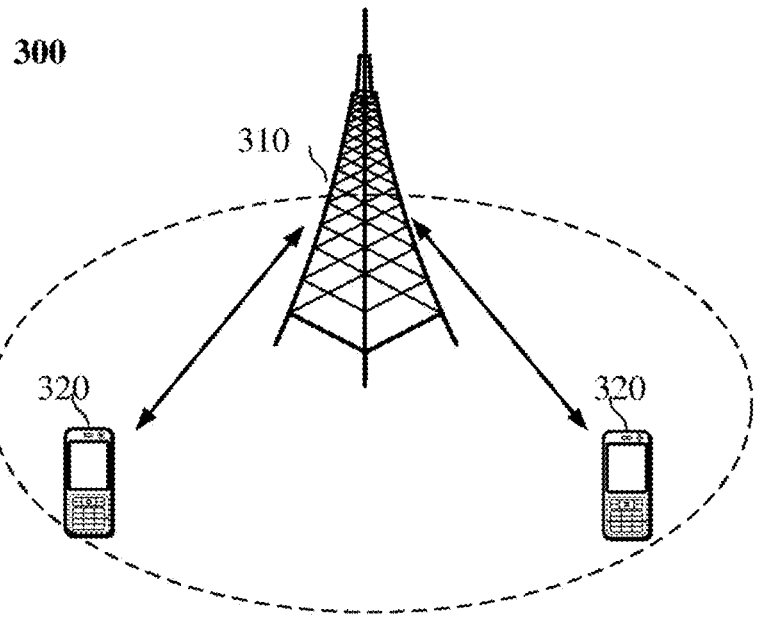
FIG. 3 is a schematic diagram of a communication system architecture provided by an embodiment of the present application.

Illustratively, FIG. 3 is a schematic diagram of a communication system architecture provided by an embodiment of the application. A communication system 300 may include a network device 310, and the network device 310 may be a device that communicates with a terminal device 320 (or called a communication terminal device or a terminal device). The network device 310 may provide communication coverage for a specific geographic area, and may communicate with terminal devices located in the coverage area. Optionally, the network device 310 may be a base station (BTS, Base Transceiver Station) in a GSM system or a CDMA system, or a base station (NB, NodeB) in a WCDMA system, or an evolved base station (eNB or eNodeB, Evolutional Node B) in an LTE system, or a wireless controller in a Cloud Radio Access Network (CRAN), or the network device may be a mobile switching center, a relay station, an access point, a vehicle-mounted device, a wearable device, a hub, a switch, a network bridge, a router, a network side device in a 5G network, or a network device in a future evolved Public Land Mobile Network (PLMN), etc.

The communication system 300 also includes at least one terminal device 320 located within the coverage area of the network device 310. The "terminal device" as used herein includes, but is not limited to, a device being connected through a wired line, for example, through a Public Switched Telephone Network (PSTN), a Digital Subscriber Line (DSL), a digital cable and a direct cable, and/or a device being connected through another data connection/network, and/or a device being connected through a wireless interface, for example, for a cellular network, a Wireless Local Area Network (WLAN), a digital television network like a Digital Video Broadcasting Handheld (DVB-H) network, a satellite network and an Amplitude Modulation-Frequency Modulation (AM-FM) broadcast transmitter, and/or an apparatus arranged to receive/transmit a communication signal in another terminal device, and/or an Internet of Things (IoT) device. A terminal device arranged to communicate through a wireless interface may be referred to as a "wireless communication terminal device", a "wireless terminal device" or a "mobile terminal device". Examples of a mobile terminal device include, but not limited to: a satellite or cellular telephone, a Personal Communication System (PCS) terminal device capable of combining a cellular radio telephone and data processing, faxing and data communication capabilities; a Personal Digital Assistant (PDA) capable of including a radio telephone, a pager, Internet/intranet access, a Web browser, a notepad, a calendar and/or a Global Positioning System (GPS) receiver; and a conventional laptop and/or palmtop receiver or other electronic apparatus including a radio telephone transceiver. The terminal device may refer to an access terminal device, User Equipment (UE), a user unit, a user station, a mobile station, a mobile platform, a remote station, a remote terminal device, a mobile device, a user terminal device, a terminal device, a wireless communication device, a user agent or a user apparatus.

The access terminal device may be a cell phone, a cordless phone, a Session Initiation Protocol (SIP) phone, a Wireless Local Loop (WLL) station, a PDA, a handheld device with a wireless communication function, a computing device, other processing device connected to a wireless modem, a vehicle-mounted device, a wearable device, a terminal device in the 5G network, or a terminal device in the future evolved PLMN, etc.

Optionally, device to device (D2D, Device to Device) communication may be performed between terminal devices 320.

Optionally, a 5G system or a 5G network may also be referred to as an NR system or an NR network.

The technical solutions of the embodiments of the present application may be applied to an unlicensed spectrum or a licensed spectrum, which is not limited in the embodiments of the present application.

FIG. 3 illustratively shows one network device and two terminal devices. Optionally, the communication system 300 may include multiple network devices and other number of terminal devices may be included in the coverage of each network device, which is not limited in the embodiments of the present application.

Optionally, the communication system 300 may also include other network entities such as a network controller and a mobility management entity, etc., which is not limited in the embodiments of the present application.

It should be understood that a device with a communication function in a network/system in the embodiments of the present application may be referred to as a communication device. Taking the communication system 300 shown in FIG. 3 as an example, the communication device may include the network device 310 and a terminal device 320 with a communication function, and the network device 310 and the terminal device 320 may be the specific devices described above, which will not be repeated herein. The communication device may also include other devices in the communication system 300, for example other network entities of a network controller, a mobility management entity, etc., which are not limited in the embodiments of the present application.

It should be understood that the terms "system" and "network" are often used interchangeably herein. The term "and/or" in this context is merely an association describing associated objects, indicating that there may be three relationships, for example, A and/or B may indicate three situations that A exists separately, both A and B simultaneously exist, B exists separately. In addition, the character "/" in this description generally indicates that contextual objects are in an "or" relationship.

Figure 4:
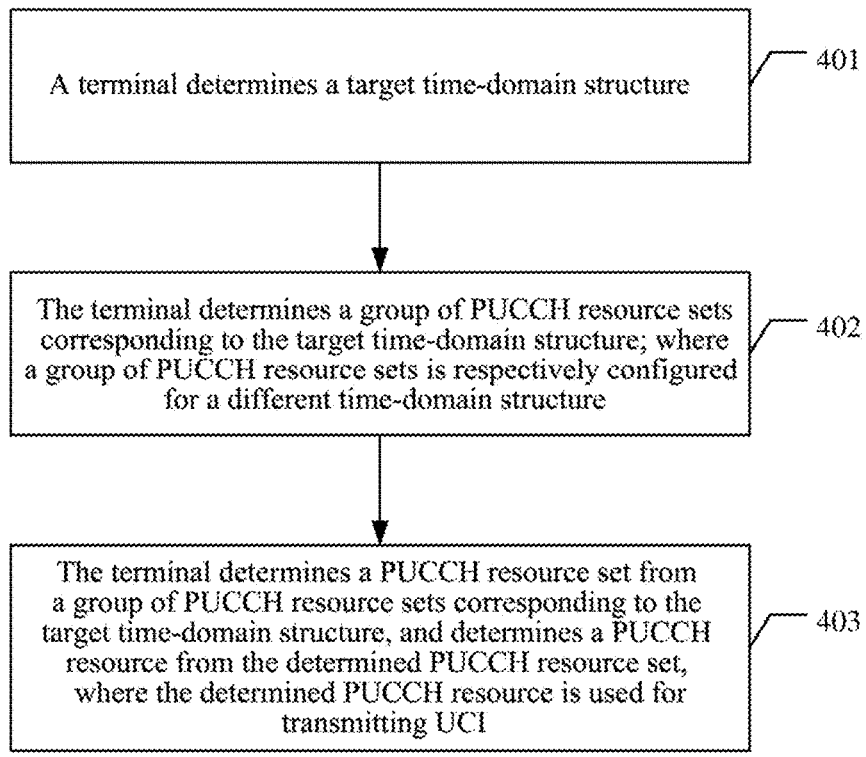
FIG. 4 is a schematic flowchart of a method for configuring a PUCCH resource set provided by an embodiment of the present application.

FIG. 4 is a schematic flowchart of a method for configuring a PUCCH resource set provided by an embodiment of the present application. As shown in FIG. 4, the following specific implementations are included.

In 401, a terminal device determines a target time-domain structure.

In 402, the terminal device determines a group of PUCCH resource sets corresponding to the target time-domain structure; where a group of PUCCH resource sets is respectively configured for a different time-domain structure.

In 403, the terminal device determines a PUCCH resource set from a group of PUCCH resource sets corresponding to the target time-domain structure, and determines a PUCCH resource from the determined PUCCH resource set, where the determined PUCCH resource is used for transmitting UCI.

In this embodiment, a group of PUCCH resource sets can be respectively configured for a different time-domain structure. Each group of PUCCH resource sets may include at least one PUCCH resource set. Each PUCCH resource set may include at least one PUCCH resource.

A PUCCH resource can be described by a series of parameters, for example, which may include an ID of the PUCCH resource, a physical resource block (PRB) location, a PUCCH format, whether frequency hopping, etc., and may further include a starting symbol, a number of symbols, a number of PRBs, an initial cyclic shift, an orthogonal cover code (OCC), etc.

The terminal device may first determine an intra-slot structure, and then may determine the target time-domain structure according to the intra-slot structure. A slot may be composed of one or more time-domain structures.

Preferably, the intra-slot structure in this embodiment may include a first intra-slot structure and at least one of the following: a second intra-slot structure, a third intra-slot structure, and a fourth intra-slot structure.

Among them, in the first intra-slot structure, a slot includes only one time-domain structure therein, the time-domain structure includes 14 symbols therein, i.e., a number of symbols included in a slot, and the time-domain structure is the slot.

Figure 1:
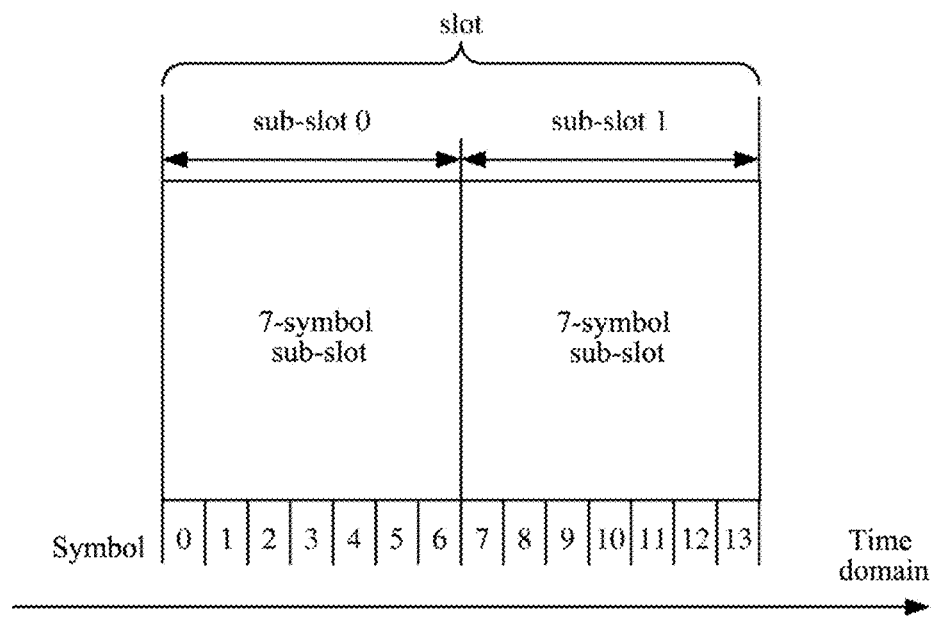
FIG. 1 is a schematic diagram of a first example of a sub-slot structure.

In the second intra-slot structure, a slot includes 2 time-domain structures therein, and each time-domain structure includes 7 symbols therein. That is, each time-domain structure is half a slot, as shown in FIG. 1.

Figure 2:
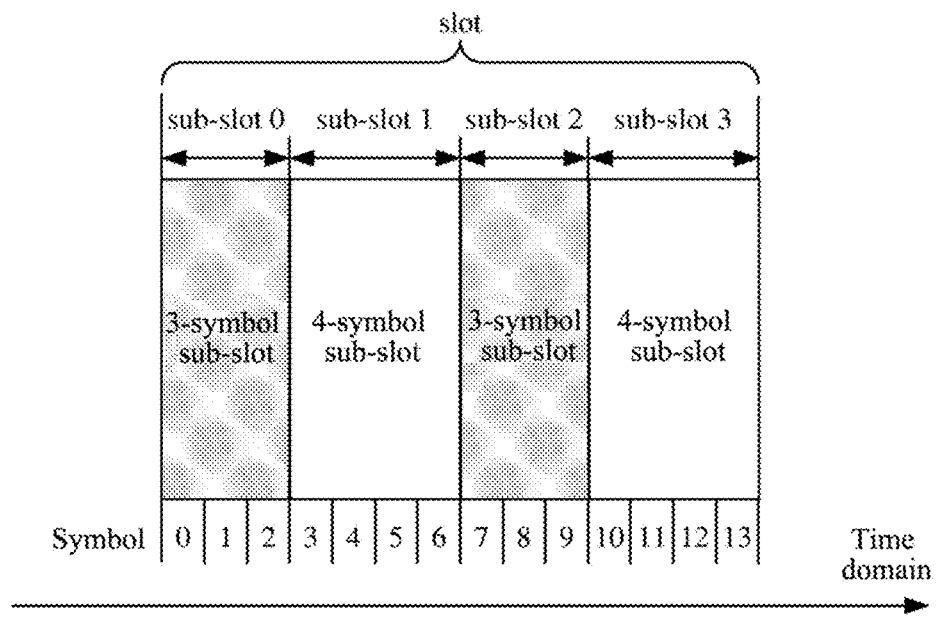
FIG. 2 is a schematic diagram of a second example of a sub-slot structure.

In the third intra-slot structure, a slot includes 4 time-domain structures therein, and each time-domain structure includes 3 or 4 symbols therein, as shown in FIG. 2.

Figure 5:
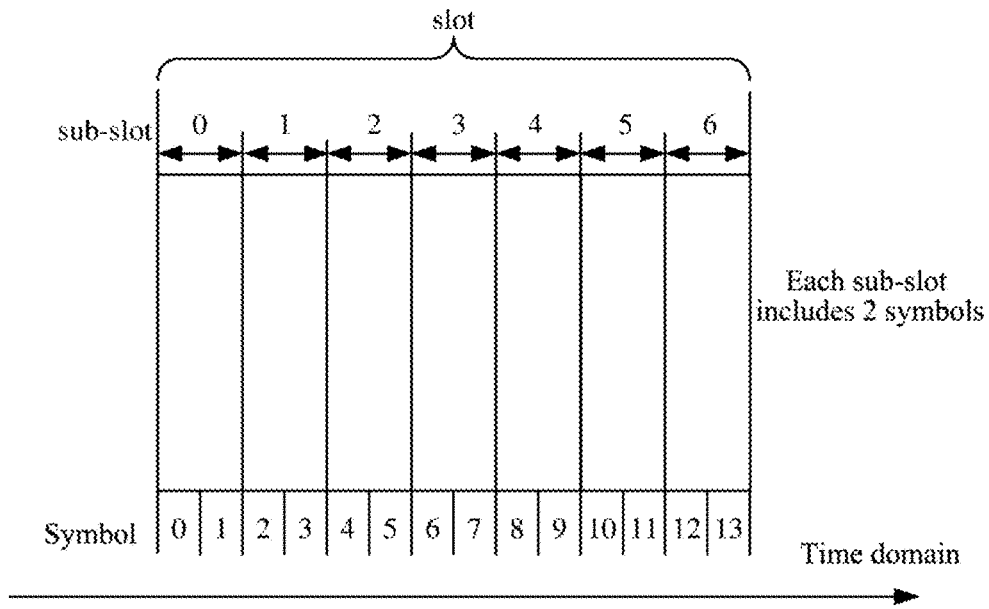
FIG. 5 is a schematic diagram of a third example of a sub-slot structure.

In the fourth intra-slot structure, a slot includes 7 time-domain structures therein, and each time-domain structure includes 2 symbols therein, as shown in FIG. 5 which is a schematic diagram of a third example of a sub-slot structure. Each sub-slot can be referred to as a time-domain structure.

The terminal device may use following approaches to determine the intra-slot structure.

1) Approach 1

The intra-slot structure is determined according to acquired network side information.

Preferably, the intra-slot structure may be determined according to indication information from the network side. The indication information from the network side may be: radio resource control (RRC) configuration information, system information, DCI information or random access response (RAR) information, etc.

Figure 6:
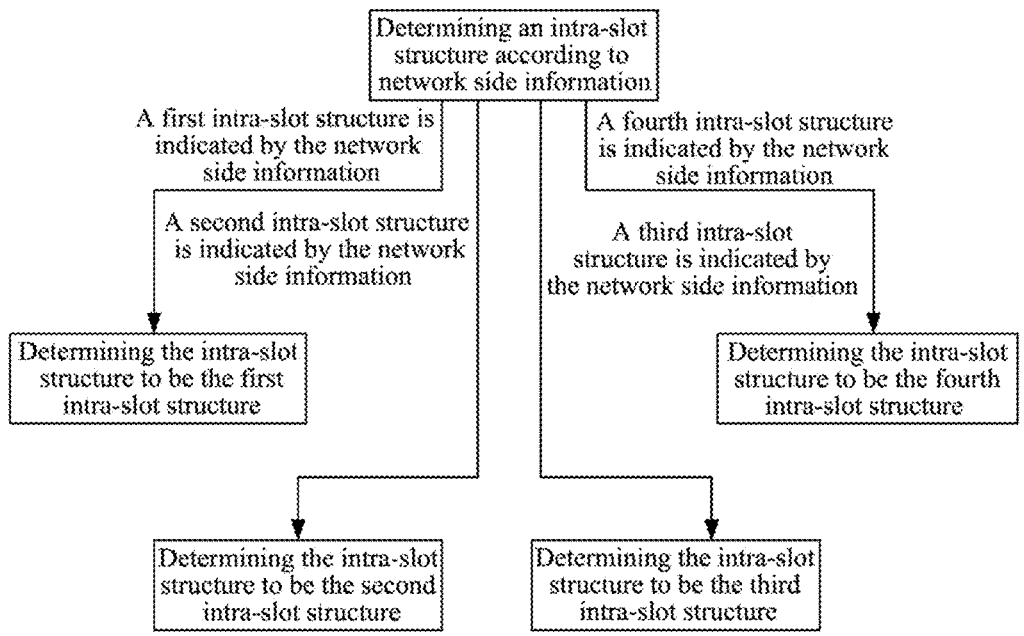
FIG. 6 is a schematic diagram of an approach for determining an intra-slot structure according to network side information provided by an embodiment of the present application.

FIG. 6 is a schematic diagram of an approach for determining an intra-slot structure according to network side information provided by an embodiment of the present application. As shown in FIG. 6, the indication information from the network side may be used to determine whether the intra-slot structure is the first intra-slot structure, the second intra-slot structure, the third intra-slot structure, or the fourth intra-slot structure.

2) Approach 2

The intra-slot structure is determined according to a RNTI used for scrambling DCI.

Figure 7:
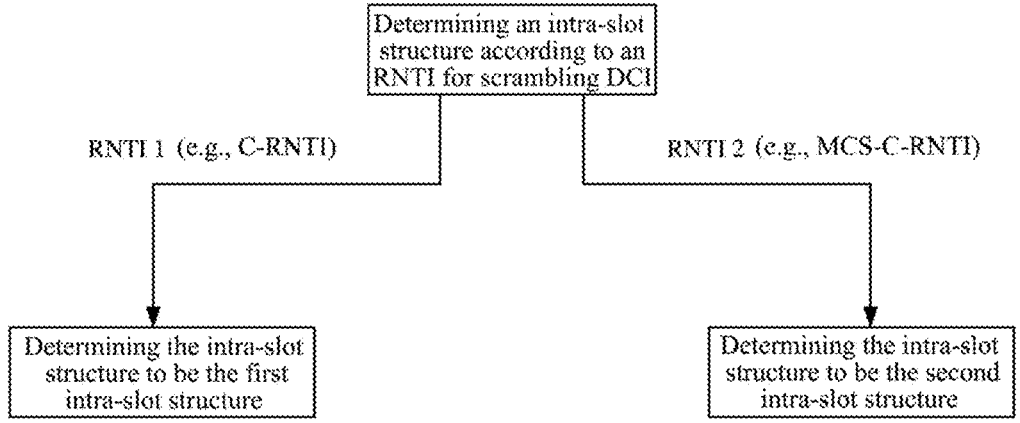
FIG. 7 is a schematic diagram of an approach for determining an intra-slot structure according to a Radio Network Temporary Identifier (RNTI) used for scrambling DCI provided by an embodiment of the present application.

FIG. 7 is a schematic diagram of an approach for determining an intra-slot structure according to an RNTI used for scrambling DCI provided by an embodiment of the present application. As shown in FIG. 7, when an RNTI used for scrambling the DCI is RNTI 1, it may be determined that the intra-slot structure is the first intra-slot structure. When the RNTI used for scrambling the DCI is RNTI 2, it may be determined that the intra-slot structure is the second intra-slot structure, and so on.

Among them, RNTI 1 may be a Cell Radio Network Temporary Identifier (C-RNTI), and RNTI 2 may be a Modulation and Coding Scheme Cell Radio Network Temporary Identifier (MCS-C-RNTI).

3) Approach 3

The intra-slot structure is determined by combining the RNTI used for scrambling the DCI and the acquired network side information. That is, the approach 1 and the approach 2 are used in combination.

Figure 8:
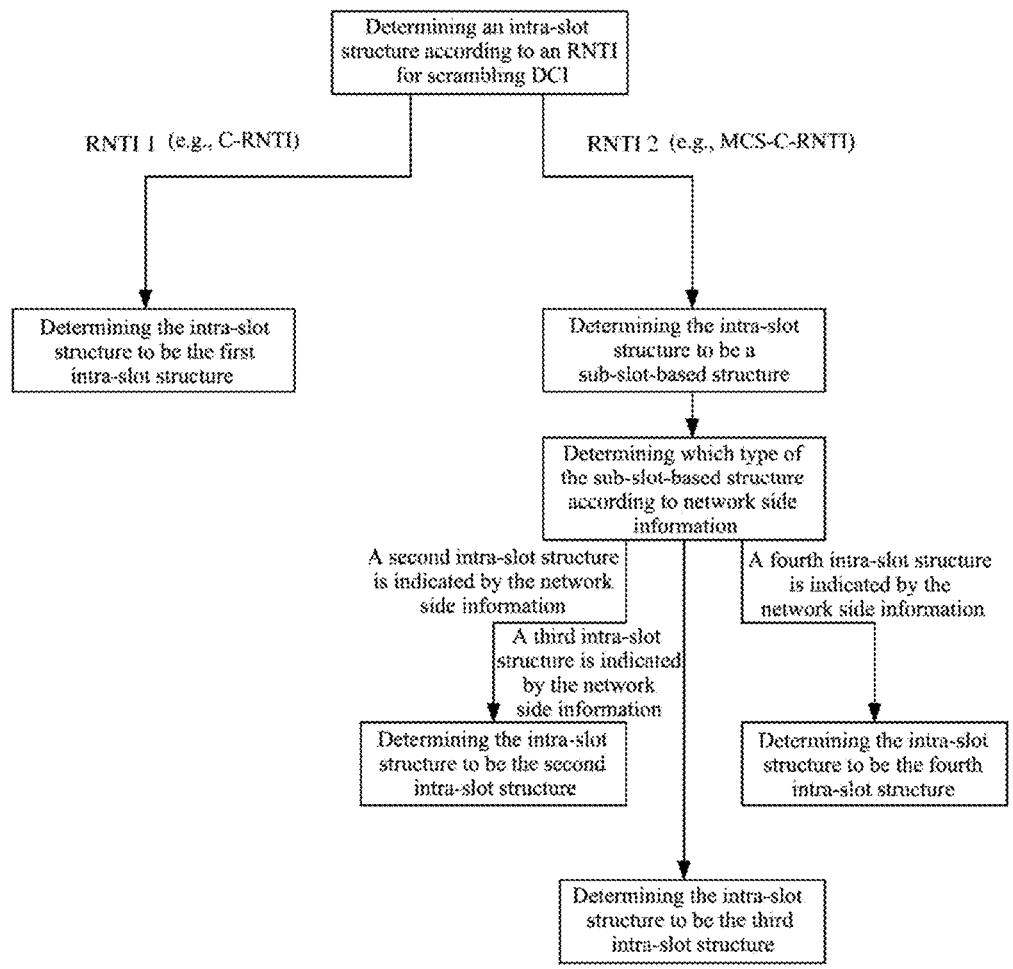
FIG. 8 is a schematic diagram of an approach for determining an intra-slot structure by combining the RNTI used for scrambling the DCI and the acquired network side information provided by an embodiment of the present application.

FIG. 8 is a schematic diagram of an approach for determining an intra-slot structure by combining the RNTI used for scrambling the DCI and the acquired network side information provided by an embodiment of the present application. As shown in FIG. 8, when the RNTI used for scrambling the DCI is RNTI 1, it may be determined that the intra-slot structure is the first intra-slot structure, i.e., a slot-based structure; when the RNTI used for scrambling the DCI is RNTI 2, it may be determined that the intra-slot structure is a sub-slot-based structure. The second intra-slot structure, the third intra-slot structure, and the fourth intra-slot structure are all the sub-slot-based structure. Further, the indication information from the network side may be used to determine whether the sub-slot-based structure is the second intra-slot structure, the third intra-slot structure or the fourth intra-slot structure.

A group of PUCCH resource sets may be respectively configured for a time-domain structure in a different intra-slot structure, and the following are respectively introduced.

One PUCCH resource set in a group of PUCCH resource sets configured for a time-domain structure in the first intra-slot structure may be as shown in Table 1, in which PUCCH resources with various numbers of symbols may be included, and a sum of a starting symbol and a number of symbols in a PUCCH resource is less than or equal to 14, that is, the starting symbol+the number of symbols≤14.

One PUCCH resource set in a group of PUCCH resource sets configured for a time-domain structure in the second intra-slot structure may be as shown in Table 2, in which only PUCCH resources with a number of symbols≤7 are included. That is, the sum of the starting symbol and the number of symbols in the PUCCH resource is less than or equal to 7.

TABLE 2

Example of PUCCH resource set configuration for 7-symbol sub-slot

| Serial number of resource | Time-domain length (symbols) | Serial number of starting symbol | Configuration of frequency domain and code domain etc. |
|---|---|---|---|
| 1 | 2 | 0 | Frequency domain and code domain numerology 1 |
| 2 | 2 | 2 | Frequency domain and code domain numerology 1 |
| 3 | 2 | 4 | Frequency domain and code domain numerology 1 |
| 4 | 2 | 0 | Frequency domain and code domain numerology 2 |
| 5 | 2 | 2 | Frequency domain and code domain numerology 2 |
| 6 | 2 | 4 | Frequency domain and code domain numerology 2 |
| 7 | 2 | 0 | Frequency domain and code domain numerology 3 |
| 8 | 2 | 2 | Frequency domain and code domain numerology 3 |
| 9 | 2 | 4 | Frequency domain and code domain numerology 3 |
| 10 | 3 | 0 | Frequency domain and code domain numerology 4 |
| 11 | 3 | 3 | Frequency domain and code domain numerology 4 |
| 12 | 3 | 0 | Frequency domain and code domain numerology 5 |
| 13 | 3 | 3 | Frequency domain and code domain numerology 5 |
| 14 | 4 | 0 | Frequency domain and code domain numerology 6 |
| 15 | 4 | 3 | Frequency domain and code domain numerology 7 |
| 16 | 7 | 0 | Frequency domain and code domain numerology 8 |

Since a PUCCH resource set is separately configured for the 7-symbol sub-slot, where all the resources can be used in the sub-slot, sufficient utilization of all the resources is enabled without a waste of resources. Moreover, since optional starting symbols and the number of symbols are concentrated within fewer options, and the resource set may include more types of frequency domain and code domain numerologies, thereby greatly increasing the flexibility of frequency domain and code domain scheduling.

One PUCCH resource set in a group of PUCCH resource sets configured for a time-domain structure including 3 symbols in the third intra-slot structure may be as shown in Table 3, in which only PUCCH resources with the number of symbols≤3 are included. That is, the sum of the starting symbol and the number of symbols in the PUCCH resource is less than or equal to 3.

TABLE 3

Example of PUCCH resource set configuration for 3-symbol sub-slot

| Serial number of resource | Time-domain length (symbols) | Serial number of starting symbol | Configuration of frequency domain and code domain etc. |
|---|---|---|---|
| 1 | 2 | 0 | Frequency domain and code domain numerology 1 |
| 2 | 2 | 1 | Frequency domain and code domain numerology 1 |
| 3 | 2 | 0 | Frequency domain and code domain numerology 2 |
| 4 | 2 | 1 | Frequency domain and code domain numerology 2 |
| 5 | 2 | 0 | Frequency domain and code domain numerology 3 |
| 6 | 2 | 1 | Frequency domain and code domain numerology 3 |
| 7 | 2 | 0 | Frequency domain and code domain numerology 4 |
| 8 | 2 | 1 | Frequency domain and code domain numerology 4 |
| 9 | 2 | 0 | Frequency domain and code domain numerology 5 |
| 10 | 2 | 1 | Frequency domain and code domain numerology 5 |
| 11 | 2 | 0 | Frequency domain and code domain numerology 6 |
| 12 | 2 | 1 | Frequency domain and code domain numerology 6 |
| 13 | 3 | 0 | Frequency domain and code domain numerology 7 |
| 14 | 3 | 0 | Frequency domain and code domain numerology 8 |
| 15 | 3 | 0 | Frequency domain and code domain numerology 9 |
| 16 | 3 | 0 | Frequency domain and code domain numerology 10 |

One PUCCH resource set in a group of PUCCH resource sets configured for a time-domain structure including 4 symbols in the third intra-slot structure may be as shown in Table 4, in which only PUCCH resources with the number of symbols≤4 are included. That is, the sum of the starting symbol and the number of symbols in the PUCCH resource is less than or equal to 4.

TABLE 4

Example of PUCCH resource set configuration for 4-symbol sub-slot

| Serial number of resource | Time-domain length (symbols) | Serial number of starting symbol | Configuration of frequency domain and code domain etc. |
|---|---|---|---|
| 1 | 2 | 0 | Frequency domain and code domain numerology 1 |
| 2 | 2 | 1 | Frequency domain and code domain numerology 1 |
| 3 | 2 | 0 | Frequency domain and code domain numerology 2 |
| 4 | 2 | 1 | Frequency domain and code domain numerology 2 |
| 5 | 2 | 0 | Frequency domain and code domain numerology 3 |
| 6 | 2 | 1 | Frequency domain and code domain numerology 3 |
| 7 | 2 | 0 | Frequency domain and code domain numerology 4 |
| 8 | 2 | 1 | Frequency domain and code domain numerology 4 |
| 9 | 3 | 0 | Frequency domain and code domain numerology 5 |

TABLE 4-continued

Example of PUCCH resource set configuration for 4-symbol sub-slot

| Serial number of resource | Time-domain length (symbols) | Serial number of starting symbol | Configuration of frequency domain and code domain etc. |
|---|---|---|---|
| 10 | 3 | 0 | Frequency domain and code domain numerology 6 |
| 11 | 3 | 0 | Frequency domain and code domain numerology 7 |
| 12 | 3 | 0 | Frequency domain and code domain numerology 8 |
| 13 | 4 | 0 | Frequency domain and code domain numerology 9 |
| 14 | 4 | 0 | Frequency domain and code domain numerology 10 |
| 15 | 4 | 0 | Frequency domain and code domain numerology 11 |
| 16 | 4 | 0 | Frequency domain and code domain numerology 12 |

Since a PUCCH resource set is separately configured for the 3-symbol sub-slot and the 4-symbol sub-slot, where all the resources can be used in the sub-slot, sufficient utilization of all the resources is enabled without a waste of resources. Moreover, since optional starting symbols and the number of symbols are concentrated within fewer options, and the resource set may include more types of frequency domain and code domain numerologies, thereby greatly increasing the flexibility of frequency domain and code domain scheduling.

One PUCCH resource set in a group of PUCCH resource sets configured for a time-domain structure including 2 symbols in the fourth intra-slot structure may be as shown in Table 5, in which only PUCCH resources with the number of symbols≤2 are included. That is, the sum of the starting symbol and the number of symbols in the PUCCH resource is less than or equal to 2.

TABLE 5

Example of PUCCH resource set configuration for 2-symbol sub-slot

| Serial number of resource | Time-domain length (symbols) | Serial number of starting symbol | Configuration of frequency domain and code domain etc. |
|---|---|---|---|
| 1 | 2 | 0 | Frequency domain and code domain numerology 1 |
| 2 | 2 | 0 | Frequency domain and code domain numerology 2 |
| 3 | 2 | 0 | Frequency domain and code domain numerology 3 |
| 4 | 2 | 0 | Frequency domain and code domain numerology 4 |
| 5 | 2 | 0 | Frequency domain and code domain numerology 5 |
| 6 | 2 | 0 | Frequency domain and code domain numerology 6 |
| 7 | 2 | 0 | Frequency domain and code domain numerology 7 |
| 8 | 2 | 0 | Frequency domain and code domain numerology 8 |
| 9 | 2 | 0 | Frequency domain and code domain numerology 9 |
| 10 | 2 | 0 | Frequency domain and code domain numerology 10 |
| 11 | 2 | 0 | Frequency domain and code domain numerology 11 |
| 12 | 2 | 0 | Frequency domain and code domain numerology 12 |
| 13 | 2 | 0 | Frequency domain and code domain numerology 13 |
| 14 | 2 | 0 | Frequency domain and code domain numerology 14 |
| 15 | 2 | 0 | Frequency domain and code domain numerology 15 |
| 16 | 2 | 0 | Frequency domain and code domain numerology 16 |

Since a PUCCH resource set is separately configured for the 2-symbol sub-slot, where all the resources can be used in the sub-slot, sufficient utilization of all the resources is enabled without a waste of resources. Moreover, since optional starting symbols and the number of symbols are concentrated within fewer options, and the resource set may include more types of frequency domain and code domain numerologies, thereby greatly increasing the flexibility of frequency domain and code domain scheduling.

After determining the intra-slot structure, the terminal device may further determine the target time-domain structure according to the intra-slot structure.

Among them, when the determined intra-slot structure is the first intra-slot structure, the second intra-slot structure or the fourth intra-slot structure, the time-domain structure included in the intra-slot structure can be directly used as the target time-domain structure.

For the first intra-slot structure, the second intra-slot structure, and the fourth intra-slot structure, only one type of time-domain structure is included therein. Therefore, as long as the intra-slot structure is determined, the target time-domain structure can be determined. For example, for the first intra-slot structure, the target time-domain structure is a time-domain structure including 14 symbols. For the second intra-slot structure, the target time-domain structure is a time-domain structure including 7 symbols. For the fourth intra-slot structure, the target time-domain structure is a time-domain structure including 2 symbols.

When the determined intra-slot structure is the third intra-slot structure, since there are two time-domain structures in the third intra-slot structure, which are a time-domain structure including 3 symbols and a time-domain structure including 4 symbols respectively, the target time-domain structure cannot be determined directly. Instead, a time-domain offset amount between a time-domain structure where the uplink control information is located and a time-domain structure where a corresponding physical downlink shared channel (PDSCH) is located can be acquired and thus the target time-domain structure can be determined according to the time-domain structure where the PDSCH is located and the time-domain offset amount.

Figure 9:
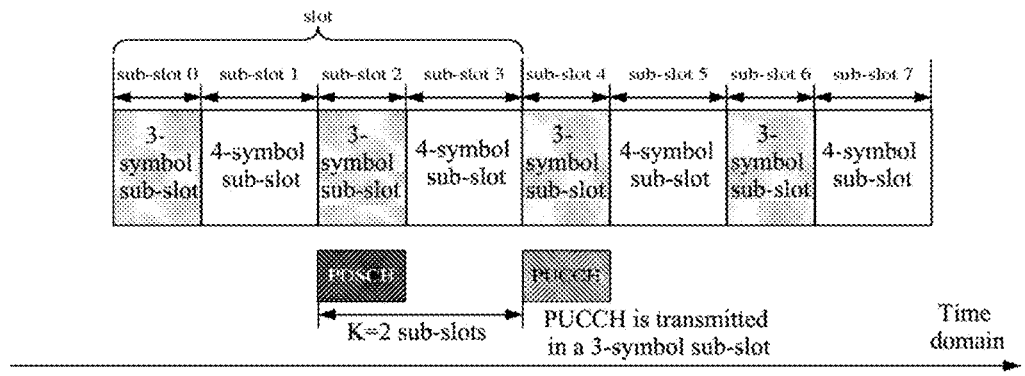
FIG. 9 is a first schematic diagram of an approach for determining a target time-domain structure based on a time-domain offset amount provided by an embodiment of the present application.
Figure 10:
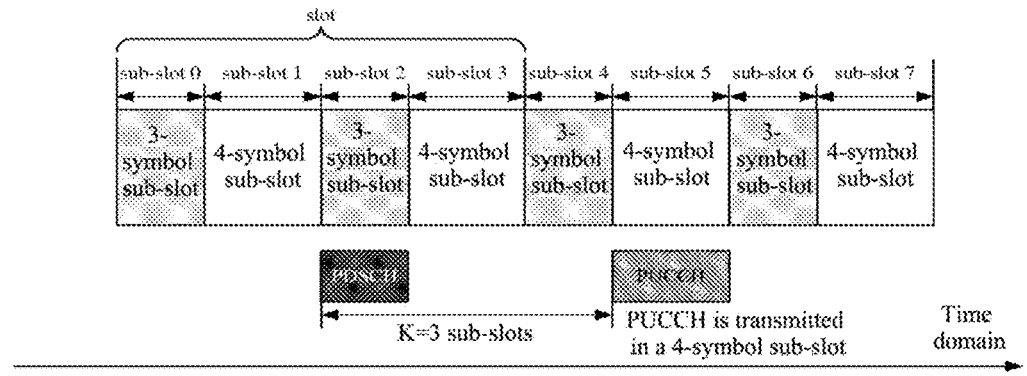
FIG. 10 is a second schematic diagram of an approach for determining a target time-domain structure based on a time-domain offset amount provided by an embodiment of the present application.

Since the time-domain structure in the third time slot internal structure is a sub-slot, an indicating unit of the time-domain offset amount K is also a sub-slot. FIG. 9 is a first schematic diagram of an approach for determining a target time-domain structure based on a time-domain offset amount provided by an embodiment of the present application. As shown in FIG. 9, assuming that the PDSCH is located in sub-slot 2, K=2 sub-slots, then a serial number of the target time-domain structure is sub-slot 4. That is, PUCCH will be transmitted in sub-slot 4. Since sub-slot 4 is a sub-slot including 3 symbols, it can be determined that the target time-domain structure is a time-domain structure including 3 symbols. FIG. 10 is a second schematic diagram of an approach for determining a target time-domain structure based on a time-domain offset amount provided by an embodiment of the present application. As shown in FIG. 10, assuming K=3 sub-slots, a serial number of the target time-domain structure is then sub-slot 5. That is, PUCCH will be transmitted in sub-slot 5. Since sub-slot 5 is a sub-slot including 4 symbols, the target time-domain structure can be determined as a time-domain structure including 4 symbols.

After determining the target time-domain structure, the terminal device may further determine a group of PUCCH resource sets corresponding to the target time-domain structure according to the made configuration, and then may determine a PUCCH resource set from a group of PUCCH resource sets corresponding to the target time-domain structure, and determine the PUCCH resource from the determined PUCCH resource set.

Among them, for a group of PUCCH resource sets corresponding to the target time-domain structure, a PUCCH resource set may be determined according to a payload of the UCI. A maximum payload of the UCI corresponding to each PUCCH resource set can be determined according to network side configuration information, and then a PUCCH resource set can be selected according to actual needs.

For the determined (selected) PUCCH resource set, the PUCCH resource can be determined according to indication information in the DCI, and then the determined PUCCH resource can be used for UCI transmission.

Preferably, the transmitted UCI is HARQ-ACK, yet the solution described in the present application is also applicable for other UCI.

The present application also discloses a method for determining a PUCCH starting symbol, which may include: determining, by a terminal device, a PUCCH resource, which includes PUCCH starting symbol information; determining, by the terminal device, K for indicating a time-domain offset amount between a PUCCH and a corresponding PDSCH and a time-domain unit of K; and determining, by the terminal device, a meaning of the PUCCH starting symbol information according to the time-domain unit of K; where if the time-domain unit of K is a slot, the PUCCH starting symbol information is a serial number of symbol of a PUCCH starting symbol in the slot; if the time-domain unit of K is less than a slot, the PUCCH starting symbol information is a symbol-level offset amount of the PUCCH starting symbol relative to a first reference point; and the first reference point is determined by a time-domain position of the PDSCH, K and the time-domain unit of K.

Figure 11:
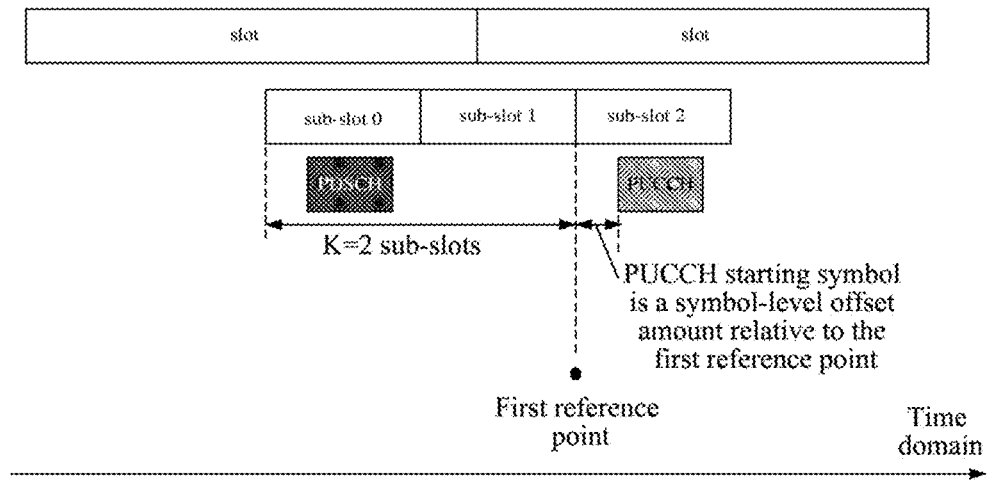
FIG. 11 is a schematic diagram of an approach for determining a PUCCH starting symbol provided by an embodiment of the present application.

Preferably, the first reference point is a starting symbol of a sub-slot where the PUCCH is located, and this reference point can be determined according to the sub-slot where the PDSCH is located, K and the time-domain unit of K (i.e., a length of the sub-slot). The PUCCH starting symbol is a symbol-level offset amount relative to the first reference point. As shown in FIG. 11, FIG. 11 is a schematic diagram of an approach for determining a PUCCH starting symbol provided by an embodiment of the present application.

The above mainly describes the processing on the terminal device side, and the following describes the processing on the network device side.

A network device may respectively configure a group of PUCCH resource sets for a different time-domain structure. Each group of PUCCH resource sets may include at least one PUCCH resource set. Each PUCCH resource set may include at least one PUCCH resource. In this way, after determining the target time-domain structure, the terminal device may further determine a group of PUCCH resource sets corresponding to the target time-domain structure, and determine a PUCCH resource set from the group of PUCCH resource sets corresponding to the target time-domain structure, and determine a PUCCH resource from the determined PUCCH resource set, where the determined PUCCH resource can be used to for transmitting UCI.

The network device may further transmit indication information to the terminal device for the terminal device to determine an intra-slot structure, and then determine the target time-domain structure according to the intra-slot structure.

The indication information may be: RRC configuration information, system information, DCI information or RAR information, etc.

Preferably, the intra-slot structure in this embodiment may include a first intra-slot structure and at least one of the following: a second intra-slot structure, a third intra-slot structure, and a fourth intra-slot structure.

Among them, in the first intra-slot structure, a slot includes only one time-domain structure therein, the time-domain structure includes 14 symbols therein, i.e., a number of symbols included in a slot, and the time-domain structure is the slot.

In the second intra-slot structure, a slot includes 2 time-domain structures therein, and each time-domain structure includes 7 symbols therein. That is, each time-domain structure is half a slot.

In the third intra-slot structure, a slot includes 4 time-domain structures therein, and each time-domain structure includes 3 or 4 symbols therein.

In the fourth intra-slot structure, a slot includes 7 time-domain structures therein, and each time-domain structure includes 2 symbols therein.

A group of PUCCH resource sets can be respectively configured for a time-domain structure in a different intra-slot structure.

Preferably, a sum of a starting symbol and a number of symbols in a PUCCH resource in a PUCCH resource set configured for a time-domain structure in the first intra-slot structure is less than or equal to 14.

A sum of a starting symbol and a number of symbols in a PUCCH resource in a PUCCH resource set configured for a time-domain structure in the second intra-slot structure is less than or equal to 7.

A sum of a starting symbol and a number of symbols in a PUCCH resource in a PUCCH resource set configured for a time-domain structure including 3 symbols in the third intra-slot structure is less than or equal to 3.

A sum of a starting symbol and a number of symbols in a PUCCH resource in a PUCCH resource set configured for a time-domain structure including 4 symbols in the third intra-slot structure is less than or equal to 4.

A sum of a starting symbol and a number of symbols in a PUCCH resource in a PUCCH resource set configured for a time-domain structure in the fourth intra-slot structure is less than or equal to 2.

It should be noted that for ease of description, the aforesaid method embodiments are all described as a combination of a series of actions, but those skilled in the art should appreciate that the present application is not limited to the described order of actions because some steps may be performed in other orders or simultaneously according to the present application. Secondly, those skilled in the art should also appreciate that the embodiments described in the specification are all preferred embodiments, and the involved actions and modules are not necessarily required by the present application.

In the aforesaid embodiments, each embodiment is described with its own emphasis. For parts that are not described in details in a certain embodiment, reference may be made to related descriptions in other embodiments.

In conclusion, using the solution described in the present application, PUCCH resource sets can be respectively configured for a slot and a sub-slot with different sub-slot lengths, so that the HARQ-ACK feedback delay of low-latency services can be reduced, probability of PUCCH resource conflict between multiple users can be reduced, efficiency of resource utilization in a PUCCH resource set can be improved, and more flexible PUCCH resource allocation can be realized, etc.

The above introduces the method embodiments, and the following further illustrates the solution of the present application through apparatus embodiments.

Figure 12:
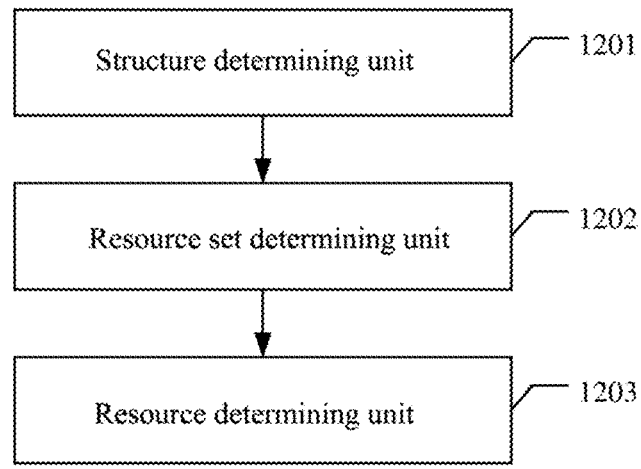
FIG. 12 is a schematic diagram of a first component structure of an apparatus for configuring a PUCCH resource set provided by an embodiment of the present application.

FIG. 12 is a schematic diagram of a first component structure of an apparatus for configuring a PUCCH resource set provided by an embodiment of the present application. As shown in FIG. 12, the following are included: a structure determining unit 1201, a resource set determining unit 1202, and a resource determining unit 1203.

The structure determining unit 1201 is configured to determine a target time-domain structure.

The resource set determining unit 1202 is configured to determine a group of PUCCH resource sets corresponding to the target time-domain structure, where a group of PUCCH resource sets is respectively configured for a different time-domain structure.

The resource determining unit 1203 is configured to determine a PUCCH resource set from a group of PUCCH resource sets corresponding to the target time-domain structure, and determine a PUCCH resource from the determined PUCCH resource set, where the determined PUCCH resource can be used for transmitting UCI.

The structure determining unit 1201 may first determine an intra-slot structure, and then determine the target time-domain structure according to the intra-slot structure.

Specifically, the structure determining unit 1201 may determine the intra-slot structure according to acquired network side information, or determine the intra-slot structure according to an RNTI used for scrambling DCI, or determine the intra-slot structure by combining the RNTI used for scrambling the DCI with the acquired network side information.

The intra-slot structure may include: a first intra-slot structure and at least one of the following: a second intra-slot structure, a third intra-slot structure, and a fourth intra-slot structure.

Preferably, in the first intra-slot structure, a slot includes only one time-domain structure therein, and the time-domain structure includes 14 symbols therein. In the second intra-slot structure, a slot includes 2 time-domain structures therein, and each time-domain structure includes 7 symbols therein. In the third intra-slot structure, a slot includes 4 time-domain structures therein, and each time-domain structure includes 3 or 4 symbols therein. In the fourth intra-slot structure, a slot includes 7 time-domain structures therein, and each time-domain structure includes 2 symbols therein.

When the intra-slot structure is the first intra-slot structure, the second intra-slot structure or the fourth intra-slot structure, the structure determining unit 1201 may use a time-domain structure included in the intra-slot structure as the target time-domain structure.

When the intra-slot structure is the third intra-slot structure, the structure determining unit 1201 may acquire a time-domain offset amount between a time-domain structure where the uplink control information is located and a time-domain structure where a corresponding PDSCH is located and determine the target time-domain structure according to the time-domain structure where the PDSCH is located and the time-domain offset amount. Among them, the time-domain offset amount may be acquired according to indication information in DCI.

Preferably, a sum of a starting symbol and a number of symbols in a PUCCH resource in a PUCCH resource set configured for a time-domain structure in the first intra-slot structure is less than or equal to 14; a sum of a starting symbol and a number of symbols in a PUCCH resource in a PUCCH resource set configured for a time-domain structure in the second intra-slot structure is less than or equal to 7; a sum of a starting symbol and a number of symbols in a PUCCH resource in a PUCCH resource set configured for a time-domain structure including 3 symbols in the third intra-slot structure is less than or equal to 3; a sum of a starting symbol and a number of symbols in a PUCCH resource in a PUCCH resource set configured for a time-domain structure including 4 symbols in the third intra-slot structure is less than or equal to 4; and a sum of a starting symbol and a number of symbols in a PUCCH resource in a PUCCH resource set configured for a time-domain structure in the fourth intra-slot structure is less than or equal to 2.

After the structure determining unit 1201 determines the target time-domain structure, the resource set determining unit 1202 may further determine a group of PUCCH resource sets corresponding to the target time-domain structure, and the resource determining unit 1203 then determines a PUCCH resource from a group of PUCCH resource sets corresponding to the target time-domain structure, and determines a PUCCH resource from the determined PUCCH resource set.

The resource determining unit 1203 may determine a PUCCH resource set from a group of PUCCH resource sets corresponding to the target time-domain structure according to a payload of the UCI, and may determine the PUCCH resource from the determined PUCCH resource set according to indication information in DCI, for transmitting uplink control information.

Preferably, the uplink control information may be HARQ-ACK information.

Figure 13:
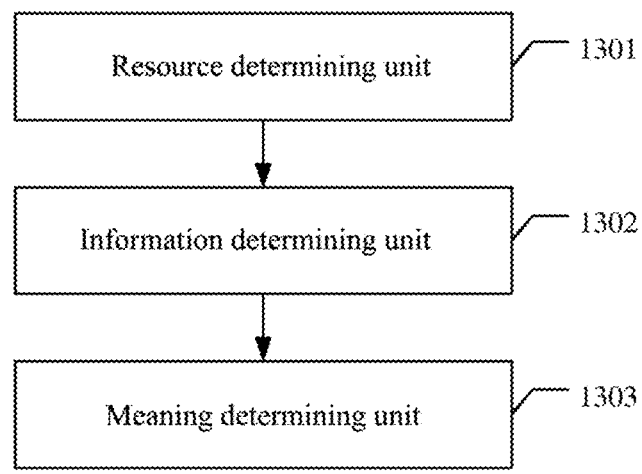
FIG. 13 is a schematic diagram of a component structure of an apparatus for determining a PUCCH starting symbol provided by an embodiment of the present application.

FIG. 13 is a schematic diagram of a structure of an apparatus for determining a PUCCH starting symbol provided by an embodiment of the present application. As shown in FIG. 13, the following are included: a resource determining unit 1301, an information determining unit 1302, and a meaning determining unit 1303.

The resource determining unit 1301 is configured to determine a PUCCH resource, including PUCCH starting symbol information.

The information determining unit 1302 is configured to determine K for indicating a time-domain offset amount between a PUCCH and a corresponding physical downlink shared channel PDSCH and a time-domain unit of K.

The meaning determining unit 1303 is configured to determine a meaning of the PUCCH starting symbol information according to the time-domain unit of K; if the time-domain unit of K is a slot, the PUCCH starting symbol information is a serial number of symbol of a PUCCH starting symbol in the slot; if the time-domain unit of K is less than a slot, the PUCCH starting symbol information is a symbol-level offset amount of the PUCCH starting symbol relative to a first reference point; the first reference point is determined by a time domain position of the PDSCH, K and the time-domain unit of K.

Figure 14:
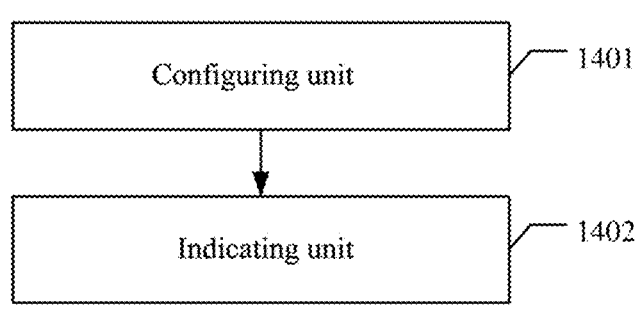
FIG. 14 is a schematic diagram of a second component structure of an apparatus for configuring a PUCCH resource set provided by an embodiment of the present application.

FIG. 14 is a schematic diagram of a second component structure of an apparatus for configuring a PUCCH resource set provided by an embodiment of the present application. As shown in FIG. 14, the following are included: a configuring unit 1401.

The configuring unit 1401 is configured to configure a group of PUCCH resource sets respectively for a different time-domain structure for a terminal device to: after determining a target time-domain structure, determine a group of PUCCH resource sets corresponding to the target time-domain structure and determine a PUCCH resource set from a group of PUCCH resource sets corresponding to the target time-domain structure; and determine a PUCCH resource from the determined PUCCH resource set, where the determined PUCCH resource is used for transmitting UCI.

The apparatus shown in FIG. 14 may further include: an indicating unit 1402 configured to transmit indication information to the terminal device, where the indication information is used for the terminal device to determine an intra-slot structure and determine the target time-domain structure according to the intra-slot structure.

The intra-slot structure may include: a first intra-slot structure and at least one of the following: a second intra-slot structure, a third intra-slot structure, and a fourth intra-slot structure.

Preferably, in the first intra-slot structure, a slot includes only one time-domain structure therein, and the time-domain structure includes 14 symbols therein. In the second intra-slot structure, a slot includes 2 time-domain structures therein, and each time-domain structure includes 7 symbols therein. In the third intra-slot structure, a slot includes 4 time-domain structures therein, and each time-domain structure includes 3 or 4 symbols therein. In the fourth intra-slot structure, a slot includes 7 time-domain structures therein, and each time-domain structure includes 2 symbols therein.

In addition, preferably, a sum of a starting symbol and a number of symbols in a PUCCH resource in a PUCCH resource set configured for a time-domain structure in the first intra-slot structure is less than or equal to 14. A sum of a starting symbol and a number of symbols in a PUCCH resource in a PUCCH resource set configured for a time-domain structure in the second intra-slot structure is less than or equal to 7. A sum of a starting symbol and a number of symbols in a PUCCH resource in a PUCCH resource set configured for a time-domain structure including 3 symbols in the third intra-slot structure is less than or equal to 3. A sum of a starting symbol and a number of symbols in a PUCCH resource in a PUCCH resource set configured for a time-domain structure including 4 symbols in the third intra-slot structure is less than or equal to 4. A sum of a starting symbol and a number of symbols in a PUCCH resource in a PUCCH resource set configured for a time-domain structure in the fourth intra-slot structure is less than or equal to 2.

Please refer to relevant descriptions in the foregoing method embodiments for the specific working procedures of the foregoing apparatus embodiments, which will not be repeated herein.

Figure 15:
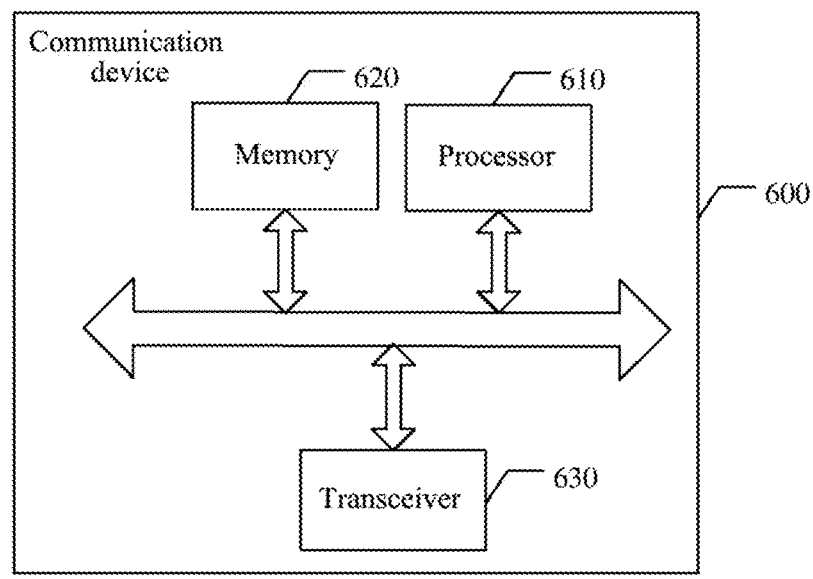
FIG. 15 is a schematic structural diagram of a communication device 600 provided by an embodiment of the present application.

FIG. 15 is a schematic structural diagram of a communication device 600 provided by an embodiment of the present application. The communication device 600 shown in FIG. 15 includes a processor 610, and the processor 610 may call and run a computer program from a memory 620 to implement the method in the embodiments of the present application.

Optionally, as shown in FIG. 15, the communication device 600 may further include the memory 620. Among them, the processor 610 may call and run a computer program from the memory 620 to implement the method in the embodiments of the present application.

Among them, the memory 620 may be a separate means independent of the processor 610, or may be integrated in the processor 610.

Optionally, as shown in FIG. 15, the communication device 600 may further include a transceiver 630, and the processor 610 may control the transceiver 630 to communicate with other devices. Specifically, it may transmit information or data to other devices, or receive information or data transmitted from other devices.

Among them, the transceiver 630 may include a transmitter and a receiver. The transceiver 630 may further include an antenna, and a number of antennas may be one or more.

Optionally, the communication device 600 may specifically be a network device of an embodiment of the present application, and the communication device 600 may implement the corresponding process implemented by the network device in each method of the embodiments of the present application. For the sake of brevity, details are not repeated here.

Optionally, the communication device 600 may specifically be a mobile terminal device/a terminal device of an embodiment of the present application, and the communication device 600 may implement the corresponding processes implemented by the mobile terminal device/the terminal device in each method of the embodiments of the present application. For the sake of brevity, details are not repeated here.

Figure 16:
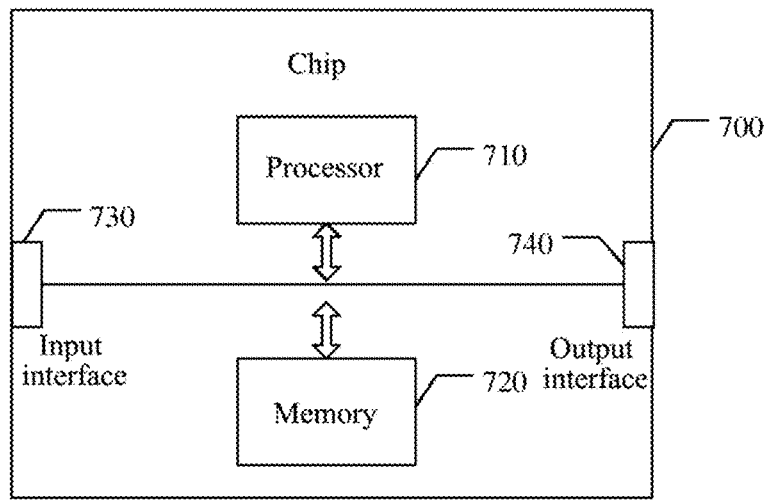
FIG. 16 is a schematic structural diagram of a chip provided by an embodiment of the present application.

FIG. 16 is a schematic structural diagram of a chip provided by an embodiment of the present application. A chip 700 shown in FIG. 16 includes a processor 710, and the processor 710 may call and run a computer program from a memory to implement the method in the embodiments of the present application.

Optionally, as shown in FIG. 16, the chip 700 may further include a memory 720. Among them, the processor 710 may call and run a computer program from the memory 720 to implement the method in the embodiments of the present application.

Among them, the memory 720 may be a separate means independent of the processor 710, or may be integrated in the processor 710.

Optionally, the chip 700 may further include an input interface 730. Among them, the processor 710 may control the input interface 730 to communicate with other devices or chips, and specifically, to acquire information or data transmitted by other devices or chips.

Optionally, the chip 700 may further include an output interface 740. Among them, the processor 710 may control the output interface 740 to communicate with other devices or chips, and specifically, to output information or data to other devices or chips.

Optionally, the chip may be applied to the network device in the embodiments of the present application, and the chip may implement the corresponding process implemented by the network device in each method of the embodiments of the present application. For the sake of brevity, details are not repeated herein again.

Optionally, the chip may be applied to the mobile terminal device/the terminal device in the embodiments of the present application, and the chip may implement the corresponding process implemented by the mobile terminal device/the terminal device in each method of the embodiments of the present application. For the sake of brevity, details are not repeated herein again.

It should be understood that the chip mentioned in the embodiments of the present application may also be referred to as a system-level chip, a system chip, a chip system, or a system on chip, etc.

Figure 17:
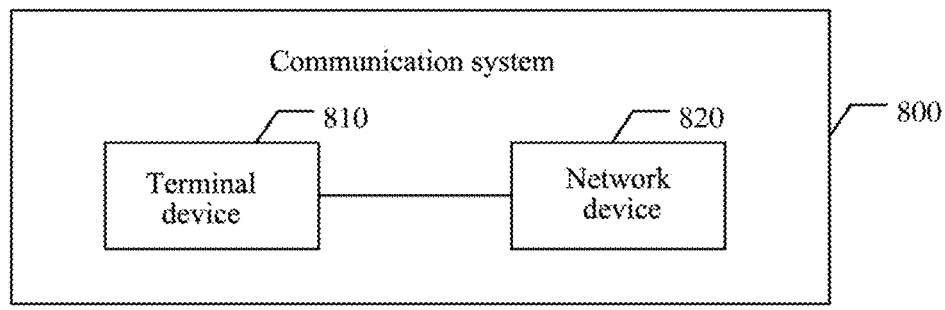
FIG. 17 is a schematic block diagram of a communication system 800 provided by an embodiment of the present application.

FIG. 17 is a schematic block diagram of a communication system 800 provided by an embodiment of the present application. As shown in FIG. 17, the communication system 800 includes a terminal device 810 and a network device 820.

Among them, the terminal device 810 may be used to implement the corresponding functions implemented by the terminal device in the above method, and the network device 820 may be used to implement the corresponding functions implemented by the network device in the above method. For the sake of brevity, repeated descriptions will not be provided herein again.

It should be understood that the processor of the embodiments of the present application may be an integrated circuit chip with a signal processing capability. In an implementation process, the steps of the foregoing method embodiments may be completed by a hardware integrated logic circuit in the processor or an instruction in a form of software. The foregoing processor may be a general-purpose processor, a digital signal processor (DSP), an application specific integrated circuit (ASIC), a field programmable gate array (FPGA) or other programmable logic devices, a discrete gate or a transistor logic device, a discrete hardware component, and can implement or execute various methods, steps, and logical block diagrams disclosed in the embodiments of the present application. The general-purpose processor may be a microprocessor or the processor may also be any conventional processor or the like. The steps of the method disclosed in the embodiments of the present application may be directly embodied as being executed and completed by a hardware decoding processor, or executed and completed by a combination of hardware and software modules in the decoding processor. The software module may be located in a mature storage medium in the field such as random access memory, a flash memory, a read-only memory, a programmable read-only memory, or an electrically erasable programmable memory, a register, etc. The storage medium is located in the memory, and the processor reads the information in the memory and completes the steps of the foregoing method in combination with hardware thereof.

It can be understood that the memory in the embodiments of the present application may be a volatile memory or a non-volatile memory, or may include both volatile and non-volatile memory. Among them, the non-volatile memory may be a read-only memory (ROM), a programmable read-only memory (PROM), an erasable programmable read-only memory (EPROM), and an electrically erasable programmable read-only memory (EEPROM) or a flash memory. The volatile memory may be a random access memory (RAM), which acts as an external cache memory. By way of illustrative but not restrictive description, many forms of RAM are available, for example a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchrolink dynamic random access memory (SLDRAM) and a direct rambus random access memory (DR RAM). It should be noted that the memories of the systems and methods described herein are intended to include, but are not limited to, these and any other suitable types of memories.

Embodiments of the present application also provide a computer-readable storage medium for storing a computer program.

Optionally, the computer-readable storage medium may be applied to the network device in the embodiments of the present application, and the computer program causes a computer to execute the corresponding process implemented by the network device in the various methods of the embodiments of the present application. For the sake of brevity, repeated descriptions will be not provided herein again.

Optionally, the computer-readable storage medium may be applied to the mobile terminal device/the terminal device in the embodiments of the present application, and the computer program causes a computer to execute the corresponding process implemented by the mobile terminal device/the terminal device in the various methods of the embodiments of the present application. For the sake of brevity, repeated descriptions will be not provided herein again.

Embodiments of the present application also provide a computer program product including a computer program instruction.

Optionally, the computer program product may be applied to the network device in the embodiments of the present application, and the computer program instruction causes a computer to execute the corresponding process implemented by the network device in the various methods of the embodiments of the present application. For the sake of brevity, repeated descriptions will be not provided herein again.

Optionally, the computer program product may be applied to the mobile terminal device/the terminal device in the embodiments of the present application, and the computer program instruction causes a computer to execute the corresponding process implemented by the mobile terminal device/the terminal device in the various methods of the embodiments of the present application. For the sake of brevity, repeated descriptions will be not provided herein again.

Embodiments of the present application also provide a computer program.

Optionally, the computer program may be applied to the network device in the embodiments of the present application. When running on a computer, the computer program causes the computer to execute the corresponding process implemented by the network device in various methods of the embodiments of the present application. For the sake of brevity, repeated descriptions will be not provided herein again.

Optionally, the computer program may be applied to the mobile terminal device/the terminal device in the embodiments of the present application. When running on a computer, the computer program causes the computer to execute the corresponding process implemented by the mobile terminal device/the terminal device in various methods of the embodiments of the present application. For the sake of brevity, repeated descriptions will be not provided herein again.

A person of ordinary skill in the art may realize that the units and algorithm steps of the examples described in combination with the embodiments disclosed herein can be implemented by electronic hardware or a combination of computer software and electronic hardware. Whether these functions are executed by hardware or software depends on a specific application and design constraints of a technical solution. Professional technicians may use different methods for each specific application to implement the described functions, but such implementation should not be considered beyond the scope of the present application.

Those skilled in the art can clearly understand that, for convenience and concise description, a reference for the specific working process of the foregoing systems, apparatuses, and units may be made to the corresponding process in the foregoing method embodiments, and repeated descriptions will be not provided herein again.

In the several embodiments provided in the present application, it should be understood that the disclosed systems, apparatuses, and methods may be implemented in other ways. For example, the apparatus embodiments described above are merely illustrative. For example, the division of units is only a logical function division, and there may be other division methods in an actual implementation. For example, multiple units or components can be combined or integrated to another system, or some features can be ignored or not implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units. That is, they may be located in one place, or may be distributed on multiple network units. Some or all of the units may be selected according to actual needs to achieve the objectives of the solutions of the embodiments.

In addition, the functional units in the various embodiments of the present application may be integrated into one processing unit, or each unit may exist alone physically, or two or more units may be integrated into one unit.

If the functions are implemented in a form of a software functional unit and sold or used as an independent product, they may be stored in a computer readable storage medium. Based on this understanding, the technical solution of the present application essentially or a part that contributes to the prior art or a part of the technical solution may be embodied in a form of a software product, and the computer software product is stored in a storage medium, including several instructions causing a computer device (which may be a personal computer, a server, or a network device, etc.) to execute all or a part of the steps of the methods described in the embodiments of the present application. The foregoing storage medium includes: various media that can store a program code of a USB flash disk, a mobile hard disk, an ROM, an RAM, a magnetic disk or an optical disk, etc.

The above are only specific implementations of the present application, but the scope of protection of the present application is not limited thereto. Any person skilled in the art can easily think of changes or substitutions within the technical scope disclosed in the present application, which should be covered within the scope of protection of the present application. Therefore, the protection scope of the present application shall be subject to the protection scope of the claims.

What is claimed is:

1. A method for configuring a physical uplink control channel (PUCCH) resource set, comprising:
    determining, by a terminal device, a target time-domain structure;
    determining, by the terminal device, a PUCCH resource set group corresponding to the target time-domain structure;
    wherein different PUCCH resource set group are respectively configured for different time-domain structures; and
    determining, by the terminal device, a PUCCH resource set from the PUCCH resource set group corresponding to the target time-domain structure, and determining, by the terminal device, a PUCCH resource from the determined PUCCH resource set,
    wherein the determined PUCCH resource is used for transmitting uplink control information (UCI);
    wherein the determining, by the terminal device, the target time-domain structure comprises:
    determining, by the terminal device, an intra-slot structure, and determining the target time-domain structure according to the intra-slot structure;
    wherein the intra-slot structure is only one of the following:
    a first intra-slot structure, a second intra-slot structure, a third intra-slot structure, or a fourth intra-slot structure;
    wherein a slot in the first intra-slot structure comprises only one time-domain structure therein, and the time-domain structure comprises 14 symbols therein;
    a slot in the second intra-slot structure comprises 2 time-domain structures therein, and each time-domain structure comprises 7 symbols therein;
    a slot in the third intra-slot structure, comprises 4 time-domain structures therein, and each time-domain structure comprises 3 or 4 symbols therein; and
    a slot in the fourth intra-slot structure comprises 7 time-domain structures therein, and each time-domain structure comprises 2 symbols therein;
    wherein the determining the target time-domain structure according to the intra-slot structure comprises:
    acquiring a time-domain offset amount between a time-domain structure where the UCI is located and a time-domain structure where a corresponding physical downlink shared channel PDSCH is located and
    determining the target time-domain structure according to the time-domain structure where the PDSCH is located and the time-domain offset amount, when the intra-slot structure is the third intra-slot structure.

2. The method according to claim 1,
    wherein the determining, by the terminal device, the intra-slot structure comprises:
    determining, by the terminal device, the intra-slot structure according to acquired network side information; or
    determining, by the terminal device, the intra-slot structure according to a radio network temporary identifier (RNTI) used for scrambling downlink control information (DCI); or determining, by the terminal device, the intra-slot structure by combining the RNTI used for scrambling the DCI with the acquired network side information.

3. The method according to claim 1, further comprising:
acquiring the time-domain offset amount according to indication information in downlink control information (DCI).

4. The method according to claim 1,
wherein a sum of a starting symbol and a number of symbols in a PUCCH resource in a PUCCH resource set configured for the time-domain structure in the first intra-slot structure is less than or equal to 14;
a sum of a starting symbol and a number of symbols in a PUCCH resource in a PUCCH resource set configured for a time-domain structure in the second intra slot structure is less than or equal to 7;
a sum of a starting symbol and a number of symbols in a PUCCH resource in a PUCCH resource set configured for a time-domain structure comprising 3 symbols in the third intra-slot structure is less than or equal to 3;
a sum of a starting symbol and a number of symbols in a PUCCH resource in a PUCCH resource set configured for a time-domain structure comprising 4 symbols in the third intra-slot structure is less than or equal to 4;
a sum of a starting symbol and a number of symbols in a PUCCH resource in a PUCCH resource set configured for a time-domain structure in the fourth intra-slot structure is less than or equal to 2.

5. An apparatus for configuring a physical uplink control channel (PUCCH) resource set, comprising:
a processor and a memory,
wherein the memory is configured to store a computer program, the processor when executing the computer program, being configured to:
determine a target time-domain structure;
determine a PUCCH resource set group corresponding to the target time-domain structure;
wherein different PUCCH resource set group are respectively configured for different time-domain structures; and
determine a PUCCH resource set from the PUCCH resource set group corresponding to the target time-domain structure and determine a PUCCH resource from the determined PUCCH resource set,
wherein the determined PUCCH resource is used for transmitting uplink control information (UCI);
wherein the processor is further configured to:
determine an intra-slot structure, and determine the target time-domain structure according to the intra-slot structure;
wherein the intra-slot structure is only one of the following: a first intra-slot structure, a second intra-slot structure, a third intra-slot structure, or a fourth intra-slot structure;
wherein a slot in the first intra-slot structure, comprises only one time-domain structure therein, and the time-domain structure comprises 14 symbols therein;
a slot in the second intra-slot structure comprises 2 time-domain structures therein, and each time-domain structure comprises 7 symbols therein;
a slot in the third intra-slot structure comprises 4 time-domain structures therein, and each time-domain structure comprises 3 or 4 symbols therein; and
a slot in the fourth intra-slot structure, comprises 7 time-domain structures therein, and each time-domain structure comprises 2 symbols therein;
wherein the processor is further configured to:
acquire a time-domain offset amount between a time-domain structure where the UCI is located and a time-domain structure where a corresponding physical downlink shared channel PDSCH is located and
determine the target time-domain structure according to the time-domain structure where the PDSCH is located and the time-domain offset amount, when the intra-slot structure is the third intra-slot structure.

6. The apparatus according to claim 5, wherein the processor is further configured to:
determine the intra-slot structure according to acquired network side information; or
determine the intra-slot structure according to a radio network temporary identifier (RNTI) used for scrambling downlink control information (DCI); or
determine the intra-slot structure by combining the RNTI used for scrambling the DCI with the acquired network side information.

7. The apparatus according to claim 5,
wherein the processor is further configured to:
acquire the time-domain offset amount according to indication information in downlink control information (DCI).

8. The apparatus according to claim 5,
wherein a sum of a starting symbol and a number of symbols in a PUCCH resource in a PUCCH resource set configured for the time-domain structure in the first intra-slot structure is less than or equal to 14;
a sum of a starting symbol and a number of symbols in a PUCCH resource in a PUCCH resource set configured for a time-domain structure in the second intra-slot structure is less than or equal to 7;
a sum of a starting symbol and a number of symbols in a PUCCH resource in a PUCCH resource set configured for a time-domain structure comprising 3 symbols in the third intra-slot structure is less than or equal to 3;
a sum of a starting symbol and a number of symbols in a PUCCH resource in a PUCCH resource set configured for a time-domain structure comprising 4 symbols in the third intra-slot structure is less than or equal to 4;
a sum of a starting symbol and a number of symbols in a PUCCH resource in a PUCCHresource set configured for a time-domain structure in the fourth intra-slot structure is less than or equal to 2.

* * * * *